United States Patent [19]

Kuramoto

[11] Patent Number: 5,205,754
[45] Date of Patent: Apr. 27, 1993

[54] CLOCK SPRING CONNECTOR

[75] Inventor: Masanori Kuramoto, Miyagi, Japan

[73] Assignee: Alps Electric Co., Ltd., Tokyo, Japan

[21] Appl. No.: 851,448

[22] Filed: Mar. 16, 1992

[30] Foreign Application Priority Data

Mar. 18, 1991 [JP] Japan ............................. 3-023379[U]

[51] Int. Cl.⁵ ............................................. H01R 35/00
[52] U.S. Cl. ....................................... 439/164; 439/15
[58] Field of Search .................................. 439/15, 164

[56] References Cited

U.S. PATENT DOCUMENTS 4,722,690 2/1988 Priede.
4,735,573 4/1988 Zeller et al.
4,797,109 1/1989 Wende ................................ 439/15

*Primary Examiner*—Eugene F. Desmond
*Attorney, Agent, or Firm*—Guy W. Shoup; David W. Heid

[57] ABSTRACT

A clock spring connector has a fixed body; a movable body rotatably installed on the fixed body; a flexible cable wound between these fixed body and the movable body; and a lock member provided for restricting mutual rotation between the fixed body and the movable body. The clock spring connector further has an engaging portion provided on one of the fixed body and the movable body; a supporting portion having a key groove on the other of the fixed body and the movable body; and the lock member being provided with an engagement portion capable of engaging with the engaging portion and disengaging therefrom and a key capable of entering into the key groove and engaging with the supporting portion by being turned.

8 Claims, 3 Drawing Sheets

CLOCK SPRING CONNECTOR

BACKGROUND OF THE INVENTION

1. Field of the Invention

The present invention relates to a clock spring connector which electrically connects between a fixed body and a movable body by means of a flat cable etc., particularly relates to a lock mechanism for accurately adjusting the relative locations of the fixed body and the movable body and retaining the relative locations until the clock spring connector is installed on a steering apparatus.

2. Description of the Related Art

A clock spring connector which electrically connects between a fixed body and a movable body is installed in a steering apparatus of an automotive vehicle, and is utilized as a connecting means to an air bag or other devices. In this case, it is required that the movable body be installed on a steering wheel so as to be able to turn substantially the same angle from a neutral position of the steering wheel in either direction. For this reason, a mechanism is often provided which serves as an indicator for locational adjustment between the fixed body and the movable body.

One such mechanism is constituted such that either of the fixed body and the movable body is equipped with a rotational member having a gear, and the other of the fixed body and the movable body is equipped with an engaging member capable of engaging the gear of the rotational member. And, on every one complete revolution of the movable body, the gear engages the engaging member and rotates by a predetermined angle in response to the movable body. Therefore, when a particular tooth in the gear is positioned and the movable body is positioned at a predetermined position with respect to the fixed body, the gear is to be positioned at a neutral position.

Thus, markings are put on the particular tooth in the gear and a member pointing to this gear. When installing the clock spring connector on the steering apparatus, by makeing these markings face each other, the movable body can be installed at the neutral position with respect to the fixed body.

Further, it was necessary to retain the movable body at the neutral position with respect to the fixed body before installing an assembly consisting of the movable body and the fixed body into the steering apparatus. The Japanese Unexamined Patent Application No. SHO 62-18355 discloses a locking mechanism for this end. The locking mechanism described in this prior art reference has a lock member provided with a clip pin and an engaging projection. The clip pin is engaged into a hole opened on the movable body by utilizing a snapping action, and the engaging projection is engaged into a concave portion formed on the fixed body. The lock member is removed after finishing the installation of the steering apparatus.

However, since above-described locking member is constituted in such a manner that the clip pin is integrally formed from a hard material like plastic, and can be engaged with or disengaged from the clock spring connector by snapping in the clip pin into the hole opened on the movable body or snapping out from it, there was a problem such that, if the snapping strength of the clip pin is enhanced in order to protect the lock member from unexpectedly falling off during its shipment or transportation, removing the lock member becomes fairly troublesome when installed in the steering apparatus. Further, it was feared that the clip pin could break if the lock member was forcibly removed, and broken pieces of the clip pin would remain in the steering apparatus and generated strange sounds when the automotive vehicle was running.

SUMMARY OF THE INVENTION

It is therefore an object of the present invention, in order to solve the aforementioned problems and disadvantages encountered in the art, to provide an improved clock spring connector which is capable of not only surely locking the movable body to the fixed body but also facilitating the installation or removal of the lock member for practicing its locking operation.

To accomplish above purposes, according to the present invention, there is provided a clock spring connector comprising a fixed body; a movable body rotatably installed on the fixed body; a flexible cable wound between the fixed body and the movable body; and a lock member for restricting mutual rotation between the fixed body and the movable body; in which said clock spring connector further comprising an engagement portion provided on either of the fixed body and the movable body; a supporting portion having a key groove on the other of the fixed body and the movable body; and said lock member being provided with an engaging portion capable of engaging with said engagement portion and disengaging therefrom and a key capable of entering into said key groove and engaging with the supporting portion by being turned.

In a manufacturing process of the clock spring connector, after the movable body is adjusted its location with respect to the fixed body is positioned at a predetermined point of origin, the key of the lock member is inserted into the key groove, and the lock member is turned so that the engagement portion is engaged with the engaging portion. Thus, the key is coupled into supporting portion, and the movable body is restricted by the lock member not to rotate freely. Accordingly, in this case, the clock spring connector can be shipped or transported or stocked in the condition that the movable body is positioned to keep its origin-oriented position.

Furthermore, when the clock spring connector is mounted on the steering apparatus, the key can be removed from the key groove by performing the reverse operation; that is, by releasing the engagement portion from the engaging portion and turning the lock member in an opposite direction.

The above and other objects, features and advantages of the present invention will become more apparent from the following detailed description which is to be read in conjunction with the accompanying drawings.

DETAILED DESCRIPTION OF THE PREFERRED EMBODIMENT

Figure 1:
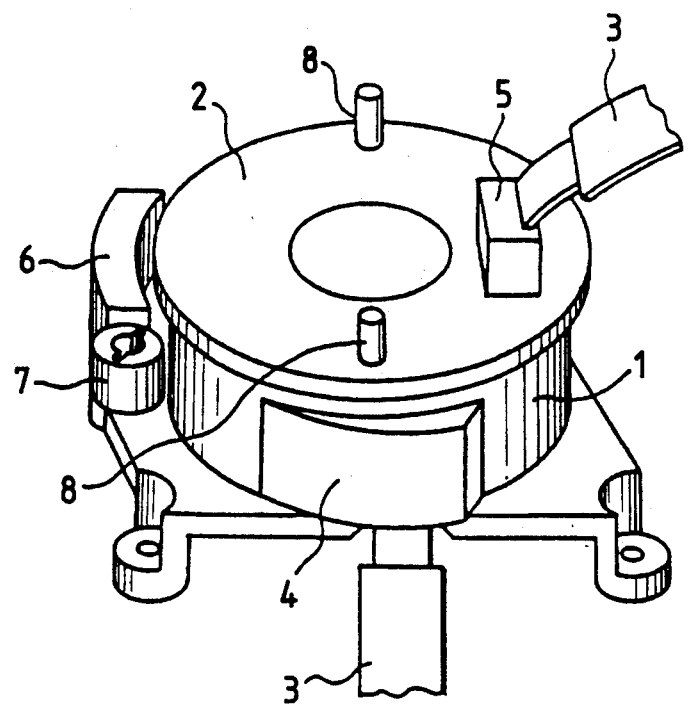
FIG. 1 is a perspective view showing one embodiment of a clock spring connector of the present invention.
Figure 2:
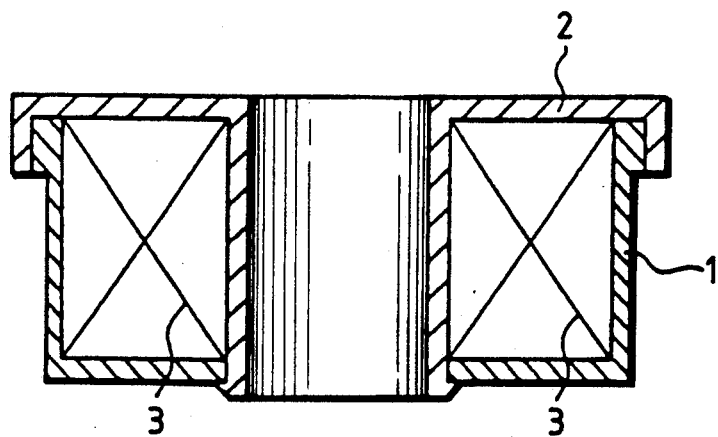
FIG. 2 is a cross-sectional view showing the clock spring connector of the present invention.
Figure 3:
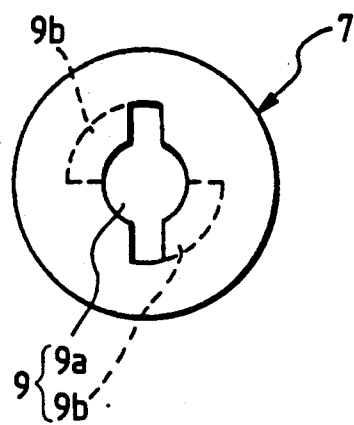
FIG. 3 is a plan view showing a supporting portion provided on the clock spring connector.
Figure 4:
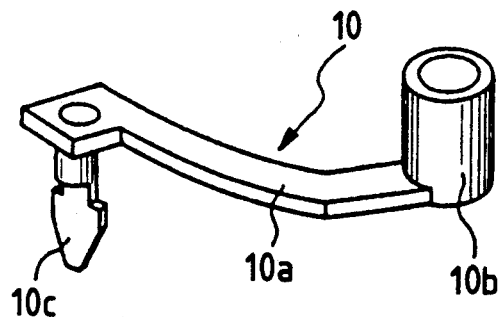
FIG. 4 is a perspective view showing a lock member detachably installed on the clock spring connector.

Hereinafter, referring now to the accompanying drawings, the preferred embodiment of the present invention is explained in detail. In FIG. 1 to 3, a reference numeral 1 denotes a fixed body having an opened upper end, at the center of which a movable body 2 is rotatably mounted so as to cover the opened upper end. A reference numeral 3 denotes a flat cable. This flat cable 3 is a well-known one that is consisted of a pair of base films and a plurality of conductive members molded between the pair of base films. And, the flat cable 3 is accommodated in a space formed between the fixed body 1 and the movable body 2 by being mounted therebetween.

One end of the flat cable 3 is taken out from the fixed body 1 through a connector 4, and the other end of the flat cable 3 is taken out from the movable body 2 through an anther connector 5. There is provided a location adjusting mechanism 6 with a geared portion (not shown) on an inner wall surface of the outer wheel of the fixed body 1. there is formed an engaging projection (not shown) on an outer periphery of the movable body 2. This engaging projection engaging with the geared portion and turns it by an amount of predetermined angle per each motion.

Further, there is provided a supporting portion 7 adjacent to the location adjusting mechanism 6 of the fixed body 1, and also there is provided an engagement portion in the form of a pair of standing connecting pins 8 on the upper surface of the movable body 2. These connecting pins 8 are provided for mounting the clock spring connector on a rotor (not shown) of the steering apparatus so as to be positioned at a predetermined place with respect to the latter. As apparatus from FIG. 3, the supporting portion includes a key groove 9, which is consisted of a key hole 9a and a pair of stepped stopper portions 9b, 9b communicating with to an inner bottom portion.

The clock spring connector in accordance with the present invention is schematically constituted as above, the movable body 2 is fixed to the steering wheel side of the steering apparatus (i.e., the rotor member), and the fixed body 1 is fixed on the bearing side of the steering shaft (i.e., a stator member), so that they can be used as an electric connecting means constituting a part of the air bag system protecting passengers of the vehicle from being severely injured in a car crash accident.

When the clock spring connector is installed into the steering apparatus in such a manner, the movable body must turn the same amount towards both clockwise and counterclockwise directions from its neutral position. For this reason, in the manufacturing step of the clock spring connector, the fixed body 1 and the movable body 2 are assembled in such a manner that the fixed body 1 and the movable body 2 accommodate the flat cable therebetween. After finishing this assembling operation, the positions of the movable body 2 and the fixed body 1 are adjusted using the location adjusting mechanism 6. And, this adjusted position is retained using a lock member 10 which is described later in detail.

The lock member 10 is made of synthetic resin material, and comprises an arm portion 10a having flexibility, an engaging cylindrical portion 10b extending upward from one end of the arm portion 10a, and an arrow-shaped key 10c extending downward from the other end of the arm portion 10a.

Figure 5:
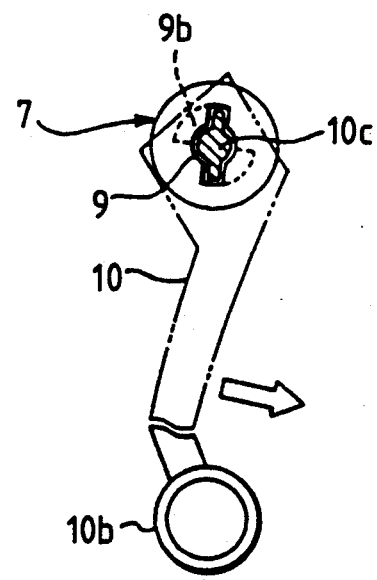
FIG. 5 is an explanatory view illustrating an installation action of the lock member.
Figure 6:
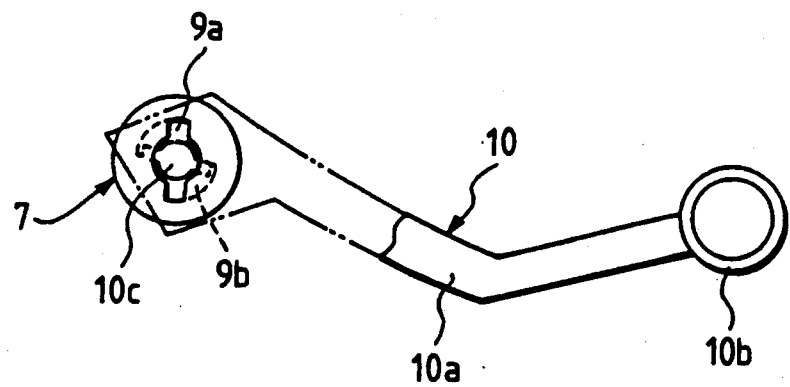
FIG. 6 is an explanatory view illustrating an installation action of the lock member.

With such an arrangement, the lock member 10 is installed on the clock spring connector when the fixed body 1 and the movable body 2 are located in correct positions, and the installed lock member 10 retains the correct positions. The lock member 10 is installed as shown in FIG. 5. The key 10c of the lock member 10 is inserted into the key hole 9a formed on the supporting portion 7 of the fixed body 1 and, in turn, the lock member 10 is turned toward a direction of an arrow in the drawing. By this rotation, the key 10c turns approximately 90 degrees in the stepped stopper portion 9b so as to be locked in the key groove 9. After this, the engaging cylindrical portion 10b is lifted upward by utilizing flexibility of the arm portion 10a, and one of the connecting pins 8 formed on the movable body 2 is inserted into a hole in the engaging cylindrical portion 10b, thereby restricting the movable body 2 from freely rotating. Accordingly, during shipment, transportation and so on of the clock spring connector, the movable body 2 does not unnecessarily rotate with respect to the fixed body 1 and retains its well adjusted condition until it is installed on the steering apparatus.

When the clock spring connector is installed on the steering apparatus, the lock member 10 is removed from the clock spring connector so that the movable body 2 is released from the locked condition. Namely, after the engaging cylindrical portion 10b is removed from the connecting pin 8 by utilizing flexibility of the arm portion 10a, the arm portion 10a is rotated toward a direction opposite to the arrow in FIG. 5 so that the key 10c coincides with the key hole 9a, and then, in this condition the key 10c is removed from the key hole 10a.

As described above, in accordance with the present invention, the lock member 10 restricts free rotation of the movable body 2, therefore, the clock spring connector can be installed on the steering apparatus while the movable body 2 is locked in the predetermined origin point. Furthermore, since the key 10c is hooked in the key groove 9 when the key 10c of the lock member 10 is inserted into the key hole 9a of the supporting portion 7, it becomes possible to surely prevent the key 10c from falling off while that the lock member 10 is installed on the clock spring connector. Moreover, flexibility of the arm portion 10a makes it easy to engage the engaging cylindrical portion 10b with the connecting pin 8 or easily disengage the engaging cylindrical portion 10b from the connecting pin 8. And further, the engaging cylindrical portion 10b prevents the lock member 10 from unexpectedly falling off the connecting pin 8 when subjected to external forces such as vibrations.

Though the above embodiment is explained based on the example in which the engaging cylindrical portion 10b can be removed from the top of the connecting pin 8 by utilizing flexibility of the arm portion 10a, the specific engaging means or configurations of the key 10c and the key groove 9 are not limited to the above embodiment.

Figure 7:
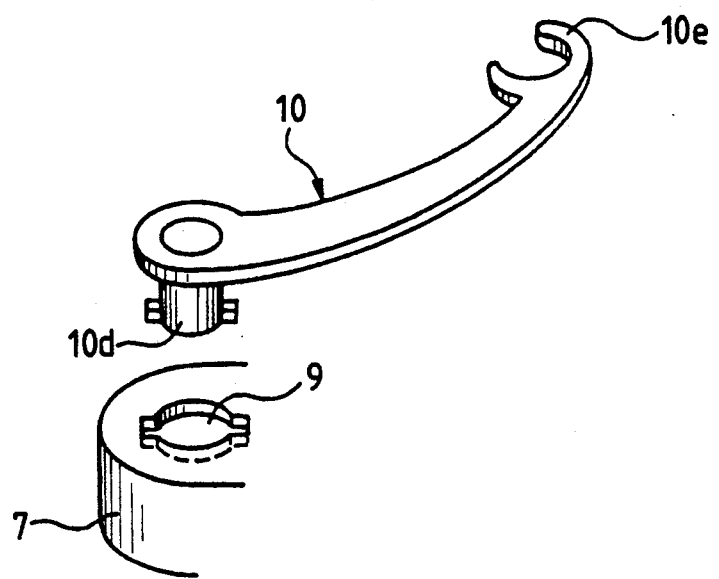
FIG. 7 is a perspective view showing a lock member and a supporting portion in accordance with an another embodiment of the present invention; and, FIG. 8 is a perspective view showing an installation condition wherein the lock member of the second embodiment is coupled with the clock spring connector.
Figure 8:
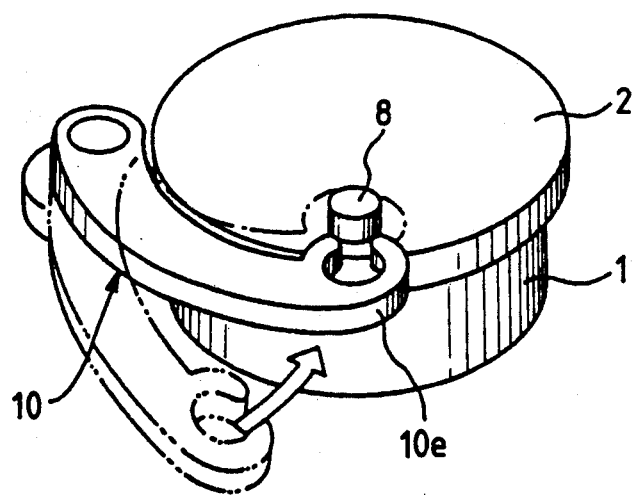

That is, for example as shown in FIG. 7, it may be preferable to provide a key 10d having two projections at one end of the lock member 10 and a hook portion 10e having elasticity. And, after inserting the key 10d into a key groove 9 formed on the supporting portion 7 of the fixed body 1 as indicated by an alternate long and two short dashes line in FIG. 8, the lock member 10 is rotated in the direction of the arrow in FIG. 8. Then, the hook portion 10e of the lock member 10 is enlarged to engage with the connecting pin 8 of the movable body 2 at the position shown by a solid line in the drawing. In other words, the lock member 10 is engaged with the connecting pin 8 from a direction perpendicular to the rotational axis of the movable body 2.

As is explained in the foregoing description, in accordance with the present invention, the key provided at one end of the lock member can be coupled to the supporting body or removed from it by simply rotating the lock member. Therefore, it becomes possible to easily and surely lock the fixed body and the movable body or release the fixed body 1 and movable body 2 by rotating the lock member.

As this invention may be embodied in several forms without departing from the spirit or essential characteristics thereof, the present embodiment is illustrative and not restrictive, since the scope of the invention is defined by the following claims rather than by the description preceding them, and all changes that fall within meter and bounds of the claims, or the equivalent of such meter and bounds are intended to be embraced by the claims.

What is claimed is:

1. A clock spring connector comprising a fixed body; a movable body rotably installed on the fixed body for rotation about an axis; a flexible cable wound between the fixed body and the movable body; a lock member provided for restricting relative rotation of the fixed body and the movable body about the axis of rotation; an engagement portion provided on one of the fixed body and the movable body; and a supporting portion having a key groove on the other of the fixed body and the movable body, said lock member being provided with an engaging portion capable of engaging with said engagement portion and disengaging therefrom and a key capable of entering into said key groove, said lock member being locked to said supporting portion by inserting said key into said key groove and rotating said lock member about said key, said engaging portion preventing said lock member from being rotated about said key when said engagement portion is engaged with said engaging portion.

2. A clock spring connector in accordance with claim 1 in which said engaging portion of the lock member is engaged with said engagement portion of said one of the fixed body and the movable body from a direction parallel to the axis of rotation.

3. A clock spring connector in accordance with claim 1 in which said engaging portion of the lock member is engaged with said engagement portion provided on said one of the fixed body and the movable body from a direction perpendicular to the axis of rotation.

4. A clock spring connector comprising:
a fixed body;
a movable body mounted on the fixed body so that the movable body can rotate relative to the fixed body about an axis of rotation;
a flexible cable wound between the fixed body and the movable body;
an engagement portion provided on one of the fixed body and the movable body;
a supporting portion having a key groove on the other of the fixed body and the movable body; and
a lock member provided for restricting rotation of the movable body relative to the fixed body about the axis of rotation, the lock member having an engaging portion capable of engaging with and disengaging from the engagement portion and a key capable of entering into the key groove, the key and the key groove being shaped so that when the key is inserted into the key groove and the lock member is rotated about the key, the key meshes with the key groove to prevent the key from being pulled out of the key groove, thereby locking the lock member to the supporting portion.

5. The clock spring connector of claim 4 wherein the key is arrow-shaped and wherein stepped portions are provided on said supporting portion adjacent to said key groove.

6. The clock spring connector of claim 4 wherein the engaging portion, when the engagement portion is engaged with the engagement portion, prevents the lock member from being rotated about the key and thereby keeps the lock member locked to the supporting portion.

7. The clock spring connector of claim 6 wherein the engaging portion of the lock member is engaged with the engagement portion from a direction parallel to the axis of rotation.

8. The clock spring connector of claim 6 wherein the engaging portion of the lock member is engaged with the engagement portion from a direction perpendicular to the axis of rotation.

* * * * *